United States Patent [19]

Takayanagi

[11] Patent Number: 5,040,075
[45] Date of Patent: Aug. 13, 1991

[54] DIGITAL ELECTROPHOTOGRAPHIC COPYING APPARATUS

[75] Inventor: Hiroshi Takayanagi, Kanagawa, Japan

[73] Assignee: Fuji Xerox Co., Ltd., Tokyo, Japan

[21] Appl. No.: 595,857

[22] Filed: Oct. 10, 1990

[51] Int. Cl.$^5$ ..................... H04N 1/29; G01D 15/14
[52] U.S. Cl. ................................... 358/300; 346/160
[58] Field of Search ............. 358/300; 346/160, 153.1; 355/282, 285

[56] References Cited

U.S. PATENT DOCUMENTS

4,589,764  5/1986  Tadokoro ........................... 346/160

Primary Examiner—Benjamin R. Fuller
Assistant Examiner—Scott A. Rogers
Attorney, Agent, or Firm—Finnegan, Henderson, Farabow, Garrett and Dunner

[57] ABSTRACT

A digital electrophotographic copying apparatus comprising; document reading section for reading a document image and for generating image data corresponding to the document image, image storage section for temporarily storing the image data, image printing section having a fuser for producing copy images on sheets of paper based on the image data stored in the image storage section and according to an electrophotographic process, wherein the printing section operates in parallel with the reading section and the printing section operates individually, electric power supply setting unit for variably setting the level of electric power supplied to the fuser, cycle indication unit for indicating whether the printing section is operating in parallel with the reading section, or whether the printing section is operating individually, and electric power selection unit for controlling the electric power supply setting unit based on the indication obtained from said cycle indication unit.

5 Claims, 9 Drawing Sheets

DIGITAL ELECTROPHOTOGRAPHIC COPYING APPARATUS

BACKGROUND OF THE INVENTION

1. Field of the Invention

The invention relates to a digital electrophotographic copying apparatus, and, particularly relates to a digital image-storing electrophotographic copying apparatus in which image data from an original document are stored before being printed.

2. Discussion of the Related Art

A digital image-storing electrophotographic copying apparatus having a document reading means, an image storage means for temporarily storing image data obtained from the document reading means, and an image printing means for producing printed copies according to an electrophotographic process based on the image data stored in the image storage means is known in the art. This type of copying apparatus typically performs electronic recirculating document handling (hereinafter referred to as "electronic RDH"), forward/reverse outputting, sample copying, and other functions.

However, the conventional digital image-storing electrophotographic copying apparatus is expensive and used mainly for super-speed applications. As a result, power is supplied to this type of copying apparatus through a custom or exclusive scheme of electrical wiring. Electric power is, therefore, not usually a constraint upon copying apparatus performance.

However, a growing demand exists for a medium-speed, digital image-storing electrophotographic copying apparatus which may be connected to an electrical outlet in a typical office environment. In view of this demand, the production of a medium-speed, image-storing copying apparatus capable of being powered by a range of standard electrical supplies poses several technical problems.

Power supply control techniques used in the conventional image-storing electrophotographic copying apparatus simultaneously distribute power to the reading means (typically a read scanner) and the printing means, because the reading operation and the printing operation are carried out at substantially the same time. This type of conventional copying apparatus also typically provides a larger quantity of electric power to the copier fuser during heating periods than is ordinarily provided during normal copying operation in order to facilitate increased copying speeds.

As a means of optimizing electric power supply during operation, the prior art teaches a method of temporarily switching OFF an exposure light source during the return period of a scanner in order to redirect the light source power to the scanner servomotor. However, in a medium-speed apparatus (40 copies or more per minute) the exposure light source generally requires a rise time of about 50 to 200 msec. This exposure light source rise time is sufficiently short, as compared with the time required to return the scanner (about 2 to about 300 msec), to preclude switching OFF the exposure light source as a means of optimizing the electric power supply. Accordingly, it is difficult to use conventional methods of redistributing the quantity of electric power used by the exposure light source to the scanner servomotor. Consequently, no improvement in printing speed can be realized using the method.

The aforementioned problem of improving printing speed within a predetermined range of standard electrical power supplies exists in digital and analog image-storing electrophotographic copying apparatuses.

SUMMARY OF THE INVENTION

The present invention has been made in view of the above circumstances and has an object to provide an digital image-storing electrophotographic copying apparatus in which a higher printing speed can be obtained by utilizing the parallel printing cycle, that is the parallel execution of both an image reading process and a printing process, and the individual printing cycle, that is the individual execution of only a printing process without change in the quantity of electric power supplied by connection to a standard electrical outlet.

Additional objects and advantages of the invention will be set forth in part in the description which follows and in part will be obvious from the description and may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, according to an aspect of the present invention, a digital electrophotographic copying apparatus comprises a document reading section for reading a document image and for generating image data corresponding to the document image, an image storage section for temporarily storing the image data, an image printing section having a fuser for producing copy images on sheets of paper based on the image data stored in the image storage section and according to an electrophotographic process, wherein the printing section operates in parallel with the reading section and the printing section operates individually, electric power supply setting unit for variably setting the level of electric power supplied to the fuser, a cycle indication unit for indicating whether the printing section is operating in parallel with the reading section, or whether the printing section is operating individually, and n electric power selection unit for controlling the electric power supply setting unit based on the indication obtained from the cycle indication unit.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

Figure 1:
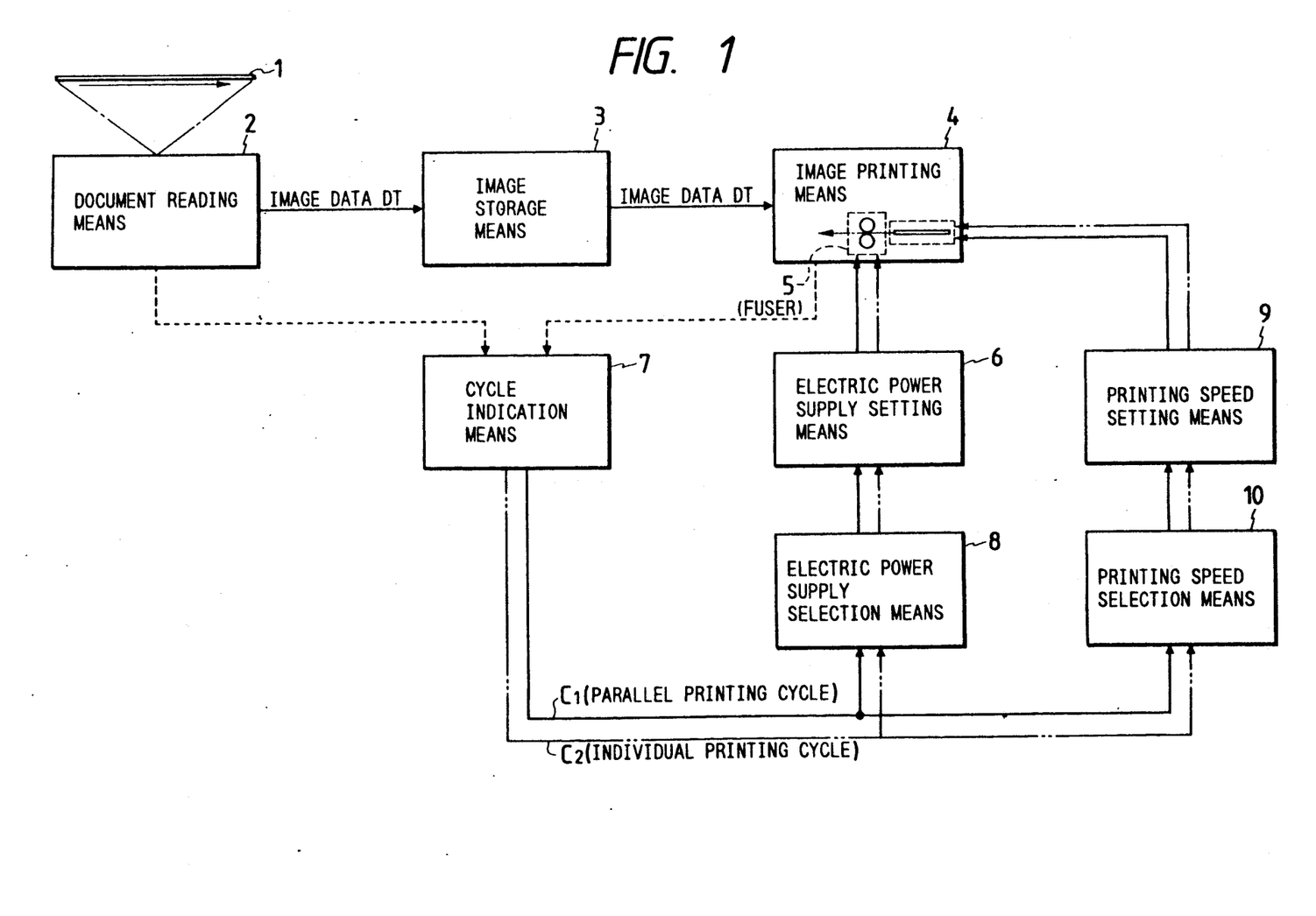
FIG. 1 is an explanatory view showing the outline of the digital electrophotographic copying apparatus according to the present invention.

FIG. 1 shows the outline of the digital electrophotographic copying apparatus according to the present invention. As shown in FIG. 1, a digital electrophotographic copying apparatus comprises a document reading means 2 for reading documents 1, an image storage means 3 for temporarily storing image data DT obtained from the document reading means 2, and an image printing means 4 for performing electrophotographic printing based on the image data DT stored in the image storage means 3.

An electric power supply setting means 6 is provided for variably setting the level of electric power supplied to a fuser 5 of the image printing means 4. A cycle indication means 7 is provided for indicating whether a current print cycle is a parallel printing cycle $C_1$ for parallel execution of both a document reading function and a printing function, or an individual printing cycle $C_2$ for execution of only a printing function. A electric power supply selection means 8 is provided for switching the electric power supply setting means 6 based on an indication obtained from the cycle indication means 7 to thereby set the level of electric power supplied to the fuser 5 in the individual printing cycle $C_2$ to a value which is relatively larger than the level of electric power supplied to the fuser 5 in the parallel printing cycle $C_1$.

FIG. 1 further provides a printing speed setting means 9 for variably setting the printing speed of the image printing means 4, and a printing speed selection means 10 for switching the printing speed setting means 9 based on the indication obtained from the cycle indication means 7 to thereby set the printing speed in the individual printing cycle $C_2$ to a value which is relatively higher than the printing speed in the parallel printing cycle $C_1$.

In the aforementioned apparatus, the electric power supply setting means 6 may also be used for changing the electric power supply level on the basis of whether a plurality of lamps are used in combination for heating the fuser 5. The electric power supply setting means 6 may be used for changing the level of electric power supplied to a lamp for heating the fuser 5 by phase control, or may be used for changing the level of electric power by cycle stealing. In short, various modifications and changes in the design of the electric power supply setting means 6 may be made as long as a plurality of levels of electric power can be set.

Further, the printing speed setting means 9 may be used for changing the printing speed by changing the paper feeding speed or may be used for changing the printing speed by changing a feed separation gap between adjacent sheets of print paper. In short, various modifications and changes in the design of the printing speed setting means 9 may be made as long as a plurality of printing speeds can be set. It is, however, necessary to set the printing speed within certain limits of the electrophotographic process. For example, the fixing property of the fuser 5 constrains the possible range of printing speed.

As described above, in the digital electrophotographic copying apparatus according to an embodiment of the present invention, when the cycle indication means 7 indicates that the current print cycle is a parallel printing cycle $C_1$, the electric power supply selection means 8 selects a relatively small quantity of electric power through the power supply setting means 6 and provides this small quantity of electric power to the fuser 5.

On the contrary, when the cycle indication means 7 indicates that the current print cycle is an individual printing cycle $C_2$, the electric power supply selection means 8 selects a relatively large quantity of electric power through the electric power supply setting means 6 and supplies this large quantity of electric power to the fuser 5.

In the above described digital image-storing electrophotographic copying apparatus, the following additional operation is carried out. When the cycle indication means 7 indicates that the current print cycle is a parallel printing cycle $C_1$, the printing speed selection means 10 selects a relatively low printing speed through the printing speed setting means 9 such that sheets of print paper are correspondingly fed at a low printing speed.

On the contrary, when the cycle indicating means 7 indicates that the current print cycle is an individual printing cycle $C_2$, the printing speed selection means 10 selects a relatively high printing speed through the printing speed setting means 9 such that sheets of print paper are correspondingly fed at a high printing speed.

Figure 2:
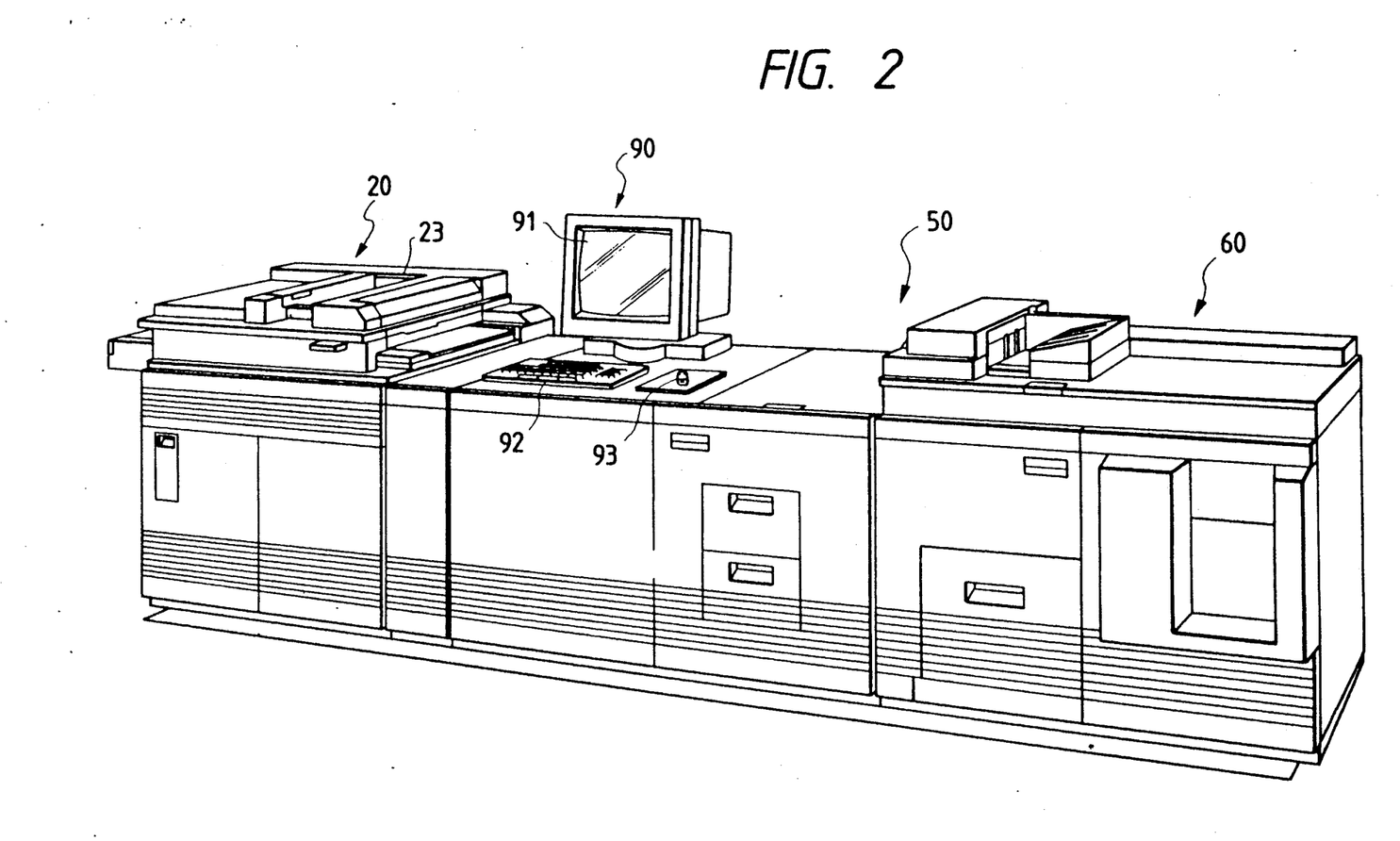
FIG. 2 is a perspective view showing the external appearance of the digital electrophotographic copying apparatus.

The preferred embodiment of the present invention, as illustrated in FIG. 2 et seq., will now be described in detail according to the following outline:

I. Overview of the Apparatus

II. Constituent Parts of the Apparatus (1) Image Input Device
(2) Image Storage
(3) Image Printer
(4) User Interface
(5) Controller III. Contents of Control of the Apparatus (1) Fuser Power Supply Control
(a) Fuser Configuration
(b) Fuser Control Circuit
(c) Fuser Power Supply Control Sequence
(2) Printing Speed Control I. Outline of the Apparatus FIG. 2 is a perspective view showing a digital image-storing electrophotographic copying apparatus according to an embodiment of the present invention. The apparatus has a document input means 20 for reading a document image as digital image data, an image storage means 50 for temporarily storing the image data obtained from the image input means 20, an image printing means 60 for performing an electrophotographic printing process based on the image data stored in the image storage means 50, a user interface 90 for designating the contents of a copying job and for checking the contents of the printed copies, and a controller (not shown) for correlatively controlling the image input means 20, the image storage means 50 and the image printing means 60 in accordance with the instructions supplied through the user interface 90.

In this embodiment, all document images are once stored in the image storage means 50 as image data. Accordingly, a plurality of copies can be of a single document page obtained by a single scanning operation in the document input means 20. A plurality of copies of each one of the input documents can also be obtained by a single scanning operation in the document input means 20, because all document pages are read and successively stored as image data in the image storage means 50 and then the image data are successively read from the image storage means and printed.

II. Constituent Parts of the Apparatus

(1) Image Input Device

Figure 3:
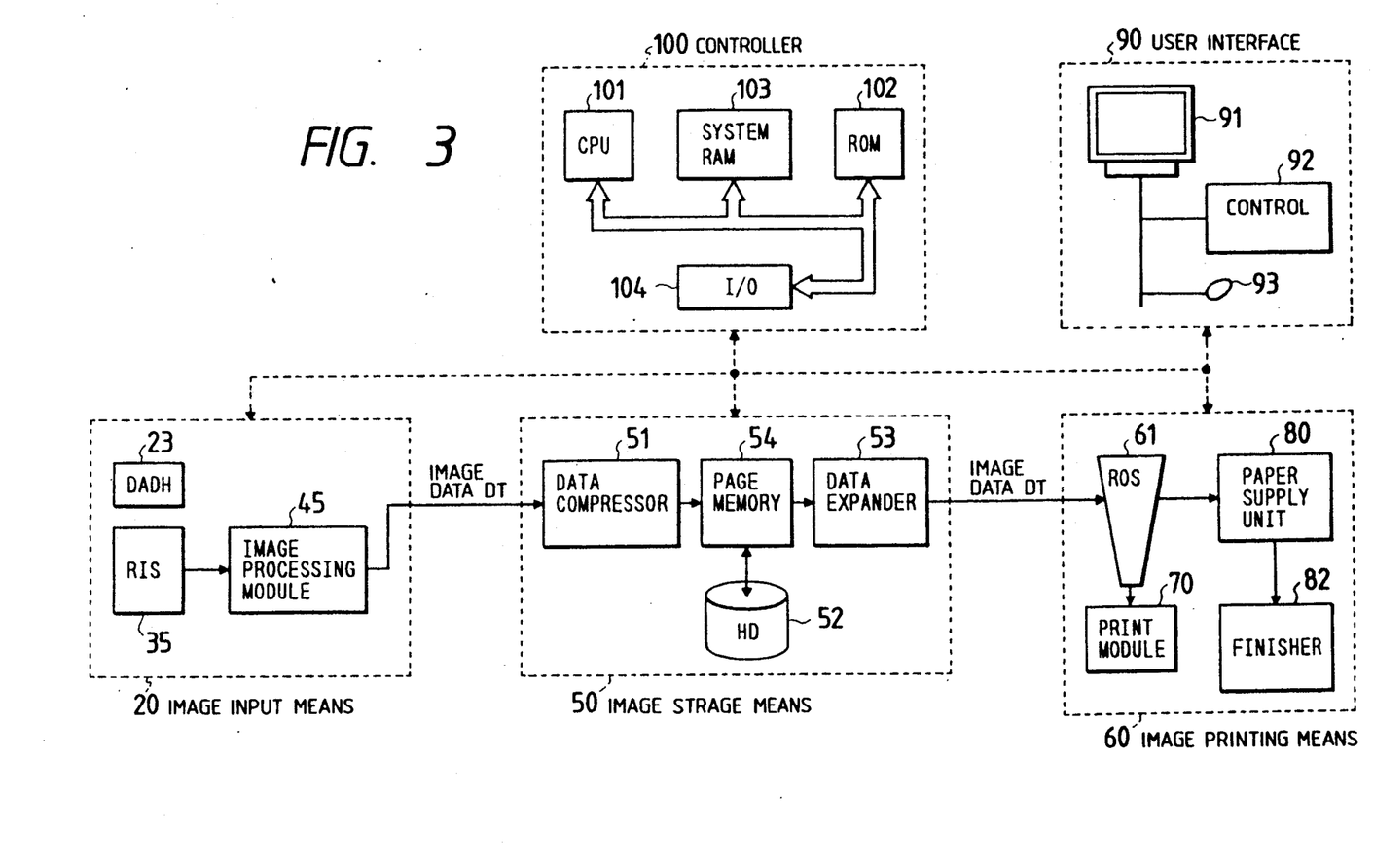
FIG. 3 is a block diagram of the digital electrophotographic copying apparatus.

As shown in FIG. 3 the copier apparatus has a duplex automatic document handler (hereinafter abbreviated to "DADH") 23 for successively and automatically feeding documents 21 onto a platen 22, a raster input scanner (hereinafter called "RIS") 35 for reading the documents 21 on the platen 22, and an image processing module 45 for performing various imaging processes (so-called shading correction, ghost correction, ground reveal removal, etc.) and various editing processes (scale-up and scale-down, italic type, half-tone dot meshing type, white-painted type, shadow type, etc.) on image data DT obtained from the RIS 35.

Figure 4:
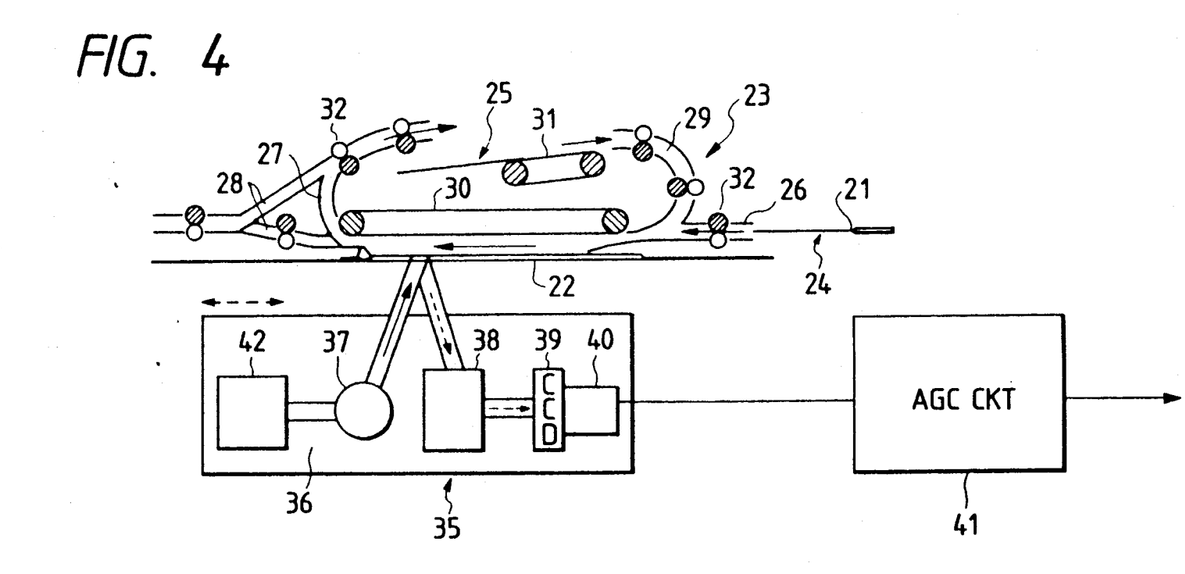
FIG. 4 is an explanatory view showing the details of the DADH and the RIS.

As shown in FIG. 4, the DADH 23 comprises a document supply path 26 for feeding a document 21 from a document set position 24 toward the platen 22, a document feedback path 27 for feeding back the document 21 from the platen 22 toward a document reception position 25, a document inversion feedback path 28 for feeding back the document 21 from the platen 22 to the document reception position 25 after inverting the document 21, a document re-supply path 29 for feeding the document 21 from the document reception position 25 toward the platen 22 again, a document transport 30 for transporting the document 21 from the document supply paths 26 and the document re-supply path 29 onto the platen 22, and feed rolls 31 and feed belts 32 suitably arranged in the respective document feed paths 26 to 29.

When a single-sided document 21 is input, the document feed paths 26 and 27 are used. When a double-sided document is input, the document feed paths 26 and 28 are used first and then the document feed paths 29 and 27 are used.

The RIS 35 has scanning fluorescent lamp 37 mounted on a scanning carriage 36 moving along one side of the platen 22, so that light from the moving fluorescent lamp 37 is radiated to the document 21 on the platen 22. The light reflected at the document is directed to an image sensor which, in this embodiment, is constituted by charge coupled device CCD 39 through a suitably arranged optical system 38. The image data read by the image sensor 39 are sent to an automatic gain control circuit 41 through a sensor interface 40 and then fed into the image processing module 45. The reference numeral 42 designates a lamp heater use for temperature control of the fluorescent lamp 37.

(2) Image Storage Device

In FIG. 3, the image storage means 50 comprises a data compressor 51 for compressing image data DT received from the image processing module 45 according to a conventional compression algorithm, a hard disk 52 for storing the image data DT compressed by the data compressor 51 as an image data file, a data expander 53 for expanding the compressed image data DT stored or the hard disk 52 according to a corresponding conventional expansion algorithm, and a page memory 54 serving as a data buffer temporarily stores one page of image data DT when the image data DT from the data compressor 51 are stored on the hard disk 52 or when the image data DT from the hard disk 52 are transferred to the data expander 53.

Information concerning the attributes of the image data file is stored in the hard disk 52 along with the image data file. As an alternate method of file storage and retrieval, the image data file attribute information may be stored in another memory provided independent of the hard disk 52 after the image data file and the image data file attribute information have been correspondingly related to each other.

Image data file attribute information contains, for example, the number of pages, the resolving power in each page, the image data structure such as the number of tones, color or monochrome, etc., the page size or the number of effective bits or bytes in the fast scanning direction (main scanning direction) or slow scanning direction (auxiliary scanning-direction), the presence or absence of photographic mode designation, the date of reading, etc.

The image data file stored on the hard disk 52 is printed according to the corresponding image data file attribute information by the image printer 60 using the instructions from the user interface 90, such as, electronic RDH, scale-up or scale-down to designated magnification, the number of copies, double-sided/single-sided, stapling, tape binding, etc. When the image data file has been printed the image data file, as well as the corresponding image data file attribute information, are erased.

(3) Image Printer

In FIG. 3, the image printing means 60 comprises a raster output scanner (hereinafter abbreviated to "ROS") 61 for generating an optical image based on the image data DT from the data expander 53, a printing module 70 for forming a latent image corresponding to the optical image generated by the ROS 61 and for making the latent image visible on recording paper, a paper supply unit 80 for supplying print paper to the printing module 70 in synchronism with the write timing of the ROS 61, and a finisher 82 for performing after-processes such as stapling, tape binding, etc., upon a bundle of print paper representing a completed document printing operation.

Figure 5:
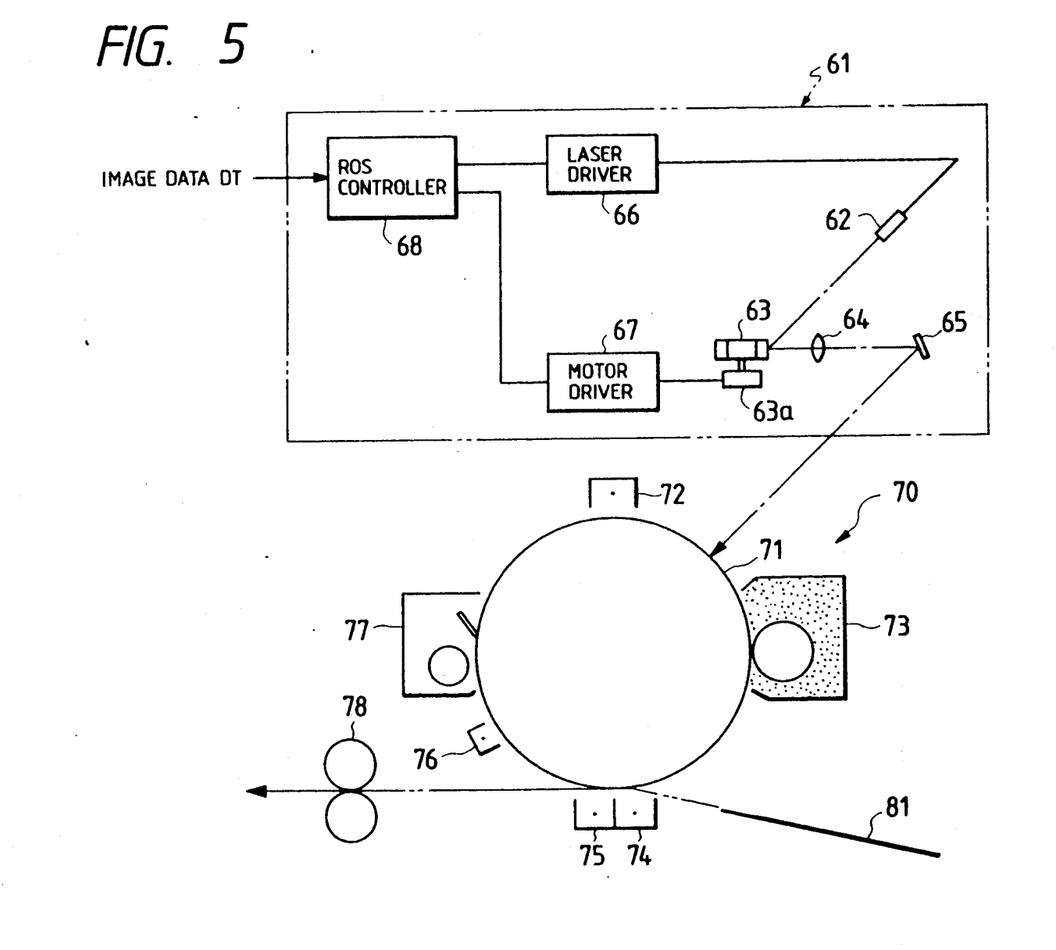
FIG. 5 is an explanatory view showing the details of the ROS and the printing module.

The ROS 61 and the printing module 70 are constituted as shown in FIG. 5. The reference numeral 62 designates a semiconductor laser, 63 a polygonal mirror for deflecting beams from the semiconductor laser 62 in a predetermined scanning range, 64 an imaging lens for converging the beams deflected by the polygonal mirror 63 to form an image along a scanning line on a photosensitive drum 71, 65 a reflection mirror for leading the beams to the scanning line position on the photosensitive drum 71, 66 a laser driver for driving the semiconductor laser 62, 67 a motor driver for driving a drive motor 63a of the polygonal mirror 63, and 68 an ROS controller for providing a predetermined control signal to the laser driver 66 and the motor driver 67 based on the image data DT received from the image storage means 50.

The photosensitive drum 71 of FIG. 5 has a photoconductive, photoreceptor layer formed on its outside. Reference numeral 72 designates an electrification corotron for preliminarily electrifying the photosensitive drum 71, 73 a developer for performing toner development on the latent image (negative latent image in which the electric potential of the image portion is lower than that of the background portion or positive latent image in which the electric potential of the image portion is higher than that of the background portion) written on the photosensitive drum 71 by the ROS 61, 74 a transfer corotron for electrifying printing paper 81 given from the paper supply unit 80 to thereby transfer the toner image on the photosensitive drum 71 to the printing paper 81, 75 a separation corotron for separating the printing paper 81 from the photosensitive drum 71 when the transfer process is finished, 76 an electricity removing corotron for removing electric charges remaining on the photosensitive drum 71, 77 a cleaner for removing toner remaining on the photosensitive drum 71, and 78 a thermal-fixing-type fuser for heating and fixing the toner image transferred to the printing paper 81.

(4) User Interface

The user interface 90 shown in FIGS. 2 and 3 has a CRT display 91 for displaying job programs and the like, a control board 92 for indicating the job programs and the like, and a mouse 93 for indicating a designated position on the CRT display 91.

(5) Controller

In FIG. 3, the controller 100 comprises a CPU 101 for generally controlling the image input device 20, the image storage device 50 and the image printer 60 according to the instructions from the user interface 90, ROM 102 for preliminarily storing various kinds of programs performed by the CPU 101, a system RAM 103 for storing rewritable data for the purpose of data exchange with respect to the CPU 101, and an I/O interface 104 for connecting the CPU 101 to an external apparatus.

In this embodiment, starting programs for starting respective devices, job progression programs for executing jobs in respective devices, failure control programs for controlling failures in respective devices, power supply control programs for controlling power supply to respective devices, printing speed control programs for controlling printing speed in respective devices, and the like, are preliminarily stored in the ROM 102.

III. Contents of Control of the Apparatus

(1) Fuser Power Supply Control

(a) Fuser Configuration

Figure 6:
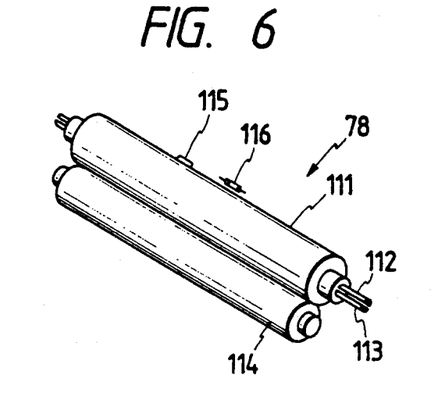
FIG. 6 is a view showing the external appearance of the fuser.

As shown in FIG. 6, the fuser 78 has a heat roll 111 including two heating quartz lamps 112 and 113 (in this embodiment, a main quartz lamp 112 of about 900 W and an auxiliary quartz lamp 113 of about 200 W), and a pressure roll 114 which rotates while being in forced contact with the heat roll 111. During a printing cycle, print paper holding an unfused toner image is passed between the rolls 111 and 114. In FIG. 6, the reference numeral 115 designates a thermosensor such as a thermistor, which is brought into contact with the heat roll 111 in order to detect the surface temperature of the heat roll 111, and 116 a fuse to the circuit supplying power to the quartz lamps 112 and 113 when the heat roll 111 is overheated.

(b) Fuser Control Circuit

Figure 7:
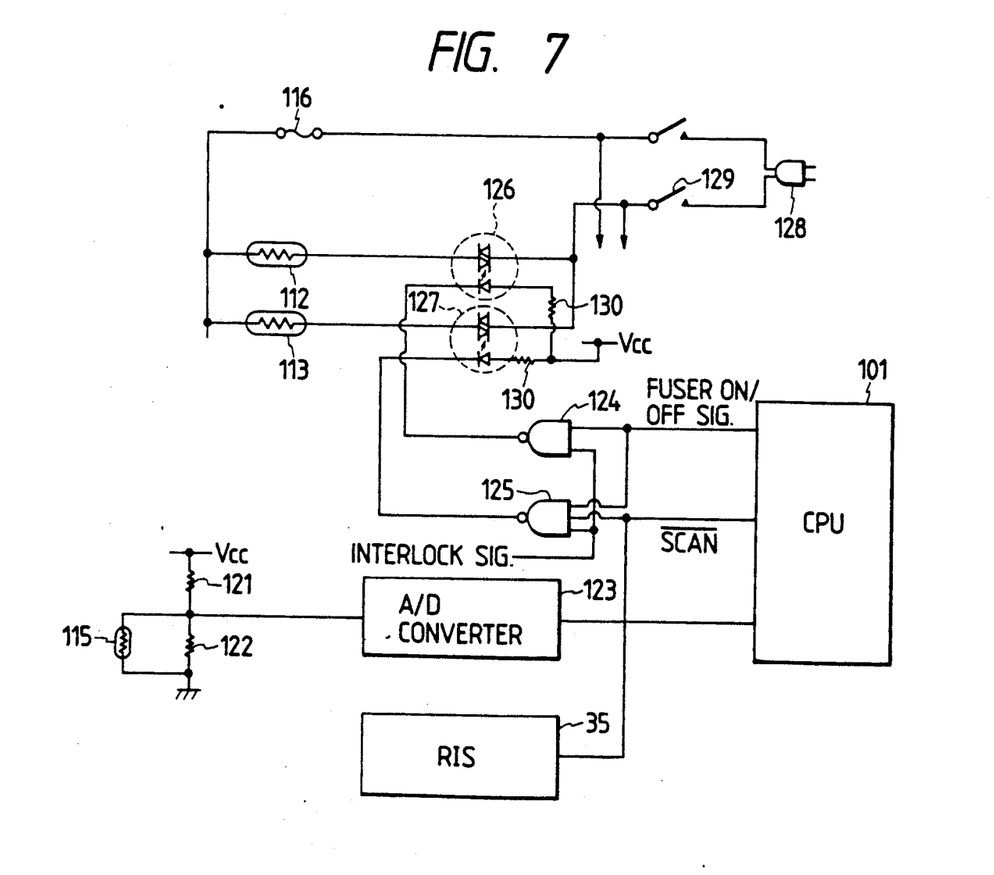
FIG. 7 is an explanatory view showing a fuser control circuit.

An example of the control circuit for a fuser 78 is shown in FIG. 7. A change in the resistance of the thermosensor 115 is detected as a change in the voltage proportionally distributed across resistors 121 and 122. The analog change in voltage an A/D converter 123 and then into the CPU 101. A fuser ON/OFF signal is output from the CPU 101 corresponds to the temperature information obtained from the thermosensor 115. The fuser ON/OFF signal, as well as an interlock signal, are input to first and second NAND gates 124 and 125. The CPU 101 also issues a scanning instruction to the RIS 35 based on information such as the presence or absence of a document, the starting designation, etc. A scan-enabled signal (SCAN) (the level of which is low during the scanning operation) is input to the second NAND gate 125. The first NAND gate 124 produces a low-level logic signal when both the level of the fuser ON/OFF signal and the level of the interlock signal are high. The second NAND gate 125 produces a low-level logic signal when both the level of the fuser ON/OFF signal and the level of the scan-enabled signal (SCAN) are high.

The main and auxiliary quartz lamps 112 and 113 are independently subjected to ON/OFF control as follows. A first photo-triac 126 is controlled by the output signal (serving as a drive signal when its level is low) of the first NAND gate 124, such that the ON/OFF control is provided for the main quartz lamp 112. A second photo-triac 127 is controlled by the output signal (serving as a drive signal when its level is low) of the second NAND gate 125, such that the ON/OFF control is provided for the auxiliary quartz lamp 113. The reference numeral 128 designates an electric outlet connector, 129 a start switch, and 130 a current adjustment resistor.

(c) Fuser Power Supply Control Sequence

Figure 8:
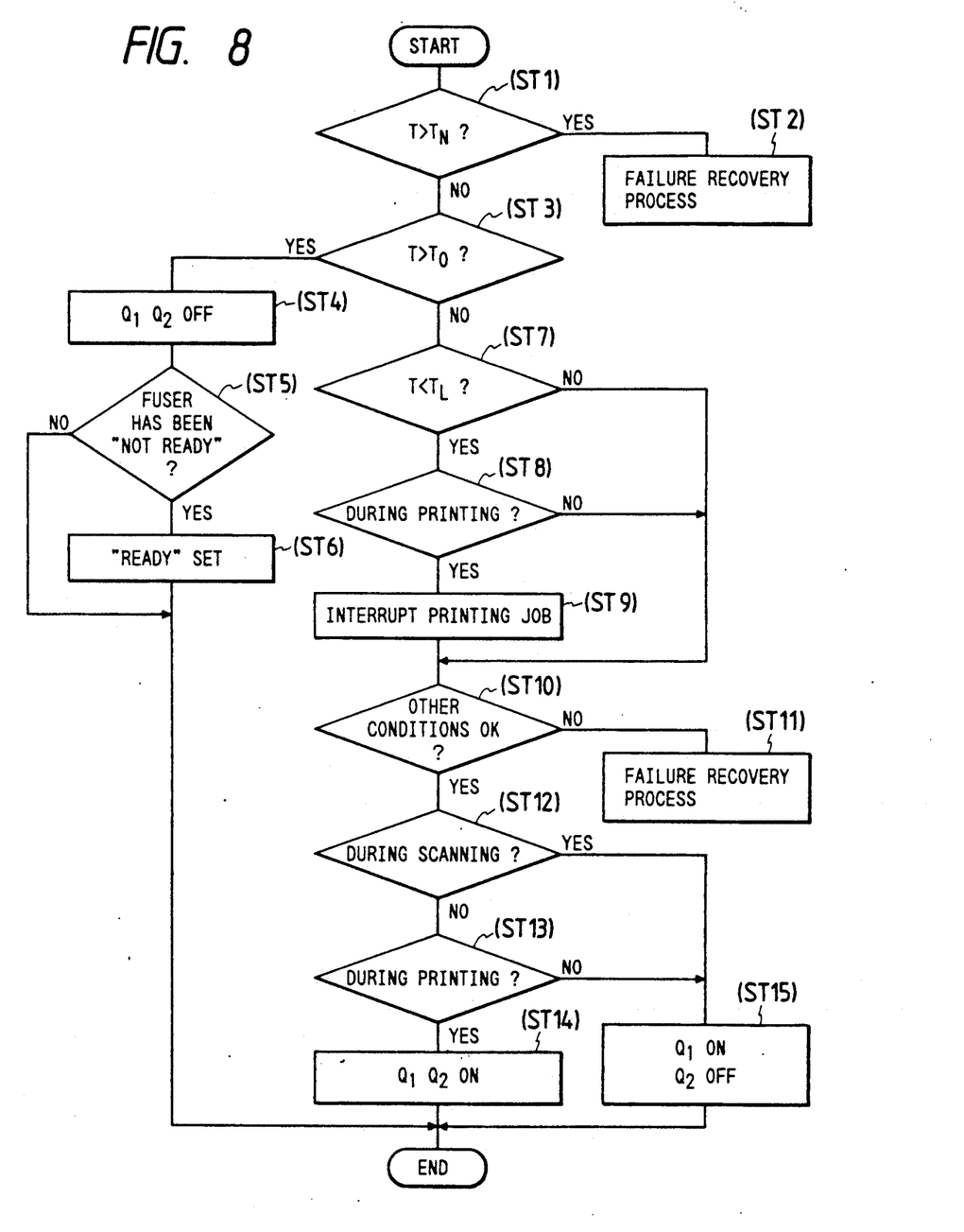
FIG. 8 is a flow chart showing the sequence of fuser power supply control.

The sequence of power supply control for the fuser 78 is shown in FIG. 8. In the sequence shown, the CPU 101 first determines whether or not the surface temperature T of the heat roll 111 is greater than the overheat temperature $T_h$ which is equivalent to a temperature at which the fuse 116 will be damaged. (Step [hereinafter abbreviated to "ST"]1). If the heat roll surface temperature is higher than the overheat temperature, a failure recovery process is carried out (ST2). If the heat roll surface temperature is not greater than the overhead temperature, ST3 is performed.

In ST3, the CPU determines whether or not the heat roll surface temperature T is greater than a target control temperature $T_o$. If $T > T_o$, the power to the main and auxiliary quartz lamps 112 (represented by $Q_1$ in FIG. 8) and 113 (represented by $Q_2$ in FIG. 8) is switched OFF (ST4). Then, a inquiry is made as to whether the fuser has been "NOT READY" (ST5). In the case where the fuser has been "NOT READY", "READY" is set (ST6) and then the series of steps is ended.

In the case where $T > T_o$ in ST3, ST7 is performed. In ST7 a determination is made as to whether $T < T_1$, where $T_1$ is the fusing failure temperature of the heat roll surface (i.e. a temperature below which a risk of fusing failure exists). If it is determined that $T<T_1$ in ST7, then ST8 determines whether a printing job is present. If the printing job is present, the printing job is interrupted (ST9).

If it is determined in ST7 that $T>T_1$ then a determination of other conditions (no strangled paper, no open interlock, no broken-down sub-unit, etc.) is made (ST10). If the other conditions are present, a failure recovery process is carried out (ST11). If the other conditions not present ST12 is performed.

In the ST12, a determination is made as to whether a scanning operation is present. If the scanning operation is not present, a determination is made as to whether a printing job is present (ST13). If the printing job is present, $Q_1$ and $Q_2$ are switched ON (ST14). Otherwise, $Q_1$ is switched ON and at the same time $Q_2$ is switched OFF following which the series of steps is ended.

Figure 9:
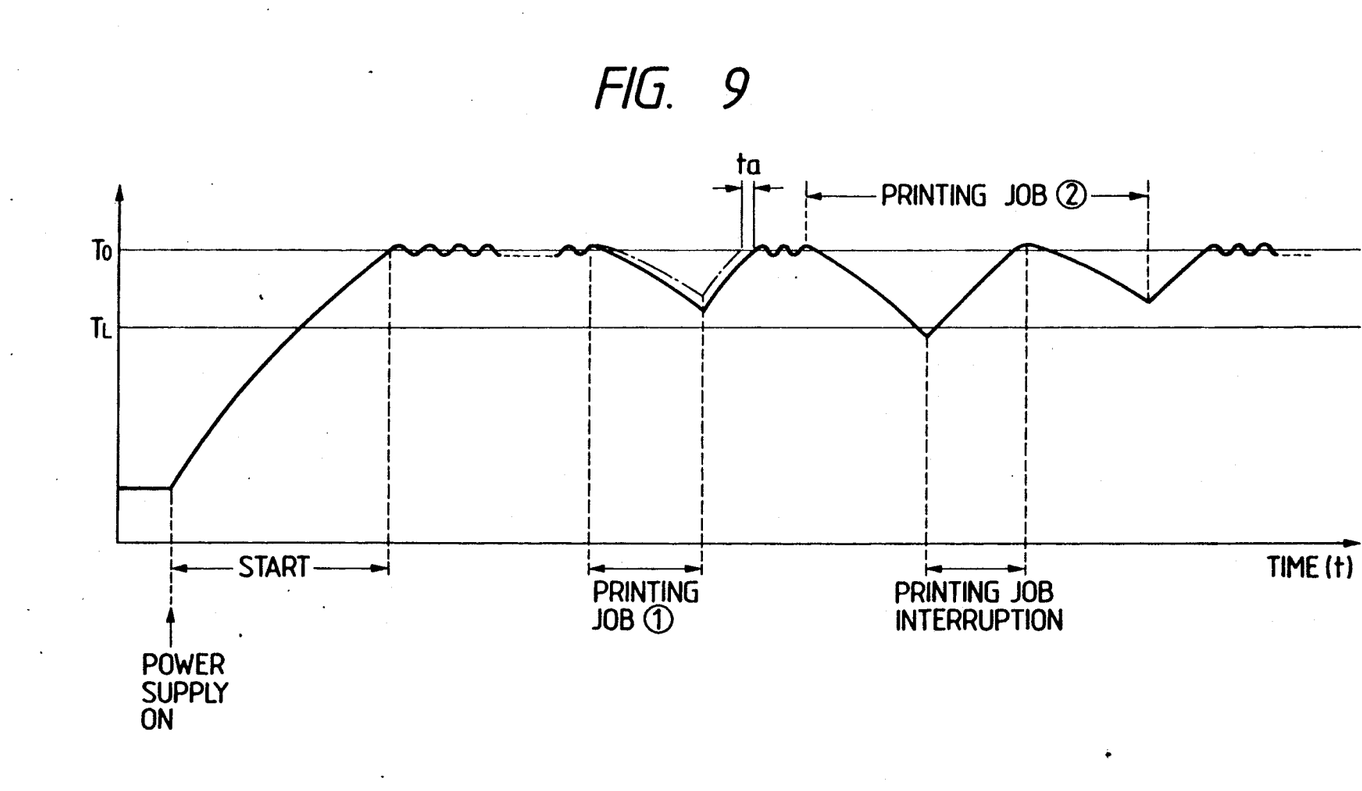
FIG. 9 is an explanatory view showing the temperature change of the fuser.

According to the aforementioned fuser power supply control sequence, when the electric source is switched ON to start the fuser as shown in FIG. 9, $Q_1$ is switched ON and the heat roll temperature gradually rises because the heat roll surface temperature T generally satisfies the condition $T<T_1$. When the heat roll temperature T exceeds the target control temperature $T_o$, the both $Q_1$ and $Q_2$ are turned off. However, when the heat roll surface temperature T is less than the target control temperature $T_o$, only $Q_1$ is switched ON during a parallel printing (scanning+printing) cycle, or both $Q_1$ and $Q_2$ are switched ON during an individual printing (printing only) cycle. Accordingly, the heat roll temperature T converges to the target control temperature $T_o$ while repeatedly overshooting and undershooting $T_o$.

Where the printing job (1), shown in FIG. 9, has a relatively small number of copies, the heat roll surface temperature T gradually falls during of the printing job. However, the heat roll surface temperature T does not reach the fusing failure temperature $T_1$ because the fuser is continuously switched ON (i.e. $Q_1$ is switched ON during the parallel printing cycle, or both $Q_1$ and $Q_2$ are switched ON during the individual printing cycle). Subsequently, the heat roll surface temperature T will gradually rise to the target control temperature $T_o$ after the aforementioned printing job (1) is finished.

During parallel printing cycle, the falling rate of the heat roll surface temperature during the printing job (1) is faster than a corresponding falling rate during an individual printing cycle. The falling rate of the heat roll surface temperature during the parallel printing cycle is shown by the solid line fin FIG. 9. The falling rate of the heat roll surface temperature during an individual printing cycle is shown by the dot-and-dash line in FIG. 9. These two falling rates are different because the electric power supplied during the individual printing cycle is larger than that supplied during the parallel printing cycle. Accordingly, the time required for the heat roll surface temperature T to return to the target control temperature $T_o$ following the printing job (1) in the individual printing cycle is shortened by time, $t_a$, as compared with the time of the parallel printing cycle. Consequently, printing speed can be improved.

Where the printing job (2), as shown in FIG. 9, has a relatively large number of copies, the heat roll surface temperature T gradually falls to the fusing failure temperature $T_1$ during the printing job (2). $T<T_1$ the printing job (2) job is interrupted so that the heat roll surface temperature T can rise. When the heat roll surface temperature T returns to the target control temperature $T_o$, the fuser is set to "READY" and the printing job (2) is restarted. Consequently, the processing time required for the individual printing cycle can be shortened as compared with that of the parallel printing cycle.

(2) Printing Speed Control

Figure 10:
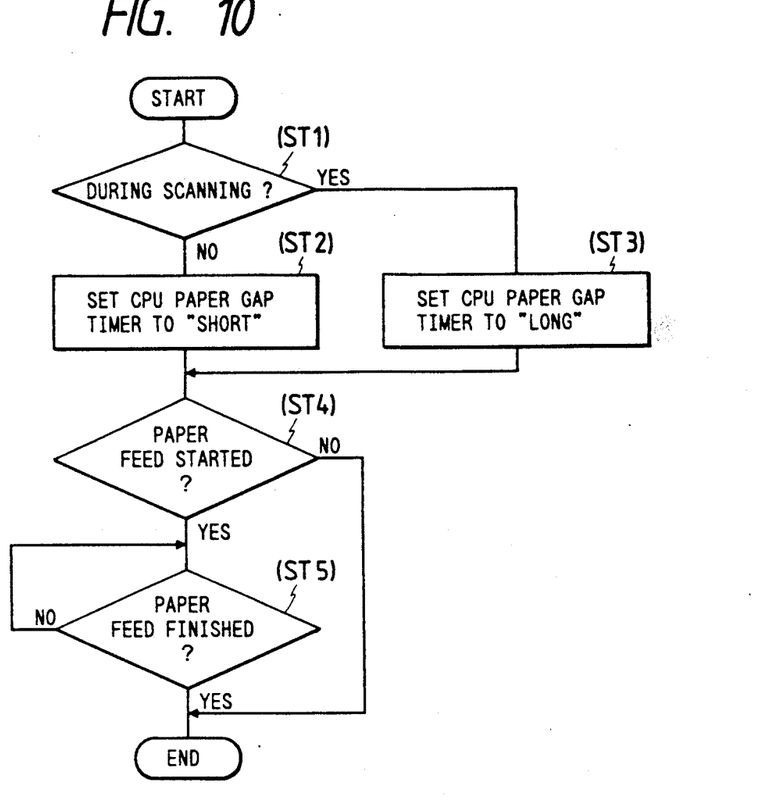
FIG. 10 is a flow chart showing the sequence of printing speed control.

The printing speed control sequence is shown in FIG. 10. According to this sequence, the CPU 101 first determines whether or not a scanning operation is present (ST1). If the scanning operation is not present, the CPU 101 determines the current print cycle to be an individual printing cycle and sets the paper gap timer to "SHORT" (ST2). If the scanning operation is present, the CPU 101 determines the current print cycle to be a parallel printing cycle and sets the paper gap timer in "LONG" (ST3). The CPU 101 next determines whether or not paper feeding is started (ST4), and then determines whether or not paper feeding is finished (ST5). When it is confirmed that paper feeding is finished the speed printing control sequence is ended.

Figure 11:
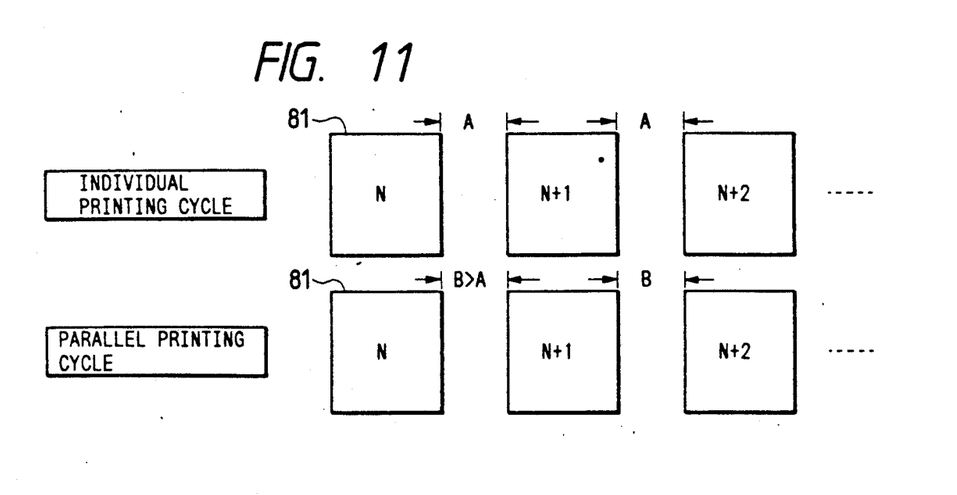
FIG. 11 is an explanatory view showing an example of paper feeding based on the printing speed control sequence.

As shown in FIG. 11 and according to the aforementioned printing speed control sequence, sheets of print paper 81 on and after the N-th sheet are successively fed with feed separation gap A during the individual printing cycle. Sheets of print paper 81 are successively fed with feed separation gap of B (B>A) during the parallel printing cycle. Consequently, printing speed in the individual printing cycle can be made substantially higher than that in the parallel printing cycle.

The quantity of electric power supplied to the fuser 87 during the individual print cycle is greater than the quantity of electric power supplied to the fuser during a parallel print cycle. Accordingly, the processing capacity of the fuser during the individual printing cycle can be improved, and as a result, the processing time for the printing job can be shortened. Improved printing speed during the individual printing cycle can be obtained without deterioration of the fusing characteristics of the fuser. Printing speed can also be improved by changing the gap between adjacent sheets of print paper. Accordingly, the printing speed can be improved without change of the paper feeding mechanism.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A digital electrophotographic copying apparatus comprising:
   document reading means for reading a document image and for generating image data corresponding to said document image;
   image storage means for temporarily storing said image data;
   image printing means having a fuser for producing copy images on sheets of paper based on said image data stored in said image storage means and according to an electrophotographic process, wherein said printing means operates in parallel with said reading means and said printing means operates individually;

electric power supply setting means for variably setting the level of electric power supplied to said fuser;

cycle indication means for indicating whether said printing means is operating in parallel with said reading means, or whether said printing means is operating individually; and electric power selection means for controlling said electric power supply setting means based on the indication obtained from said cycle indication means.

2. A digital electrophotographic copying apparatus according to claim 1, further comprising:

printing speed setting means for variably setting a speed at which said printing means produces copy images on sheets of paper; and printing speed selection means, response to an indication obtained from said cycle indication means, for controlling said printing speed setting means.

3. A digital electrophotographic copying apparatus according to claim 2, wherein said printing speed setting means adjusts the separation gap between adjacent sheets of paper.

4. A digital electrophotographic copying apparatus according to claim 1, wherein said fuser comprises:

a heat roll;

a pressure roll;

a main heating lamp having a switch between said main heating lamp and said power supply setting means;

an auxiliary heating lamp having a switch between said auxiliary heating lamp and said power supply setting means; and a thermal sensor responsive to a temperature on a surface of said heat roll.

5. A method of controlling electric power supplied to the fuser of an electrophotographic copying apparatus comprising the steps of:

determining whether the surface temperature of a heat roll is greater than a predetermined overheat value;

performing a failure recovery process if the surface temperature is greater than the overheat value;

determining whether the surface temperature is greater than a predetermined control value and if the surface temperature is greater than the control value switching OFF main and auxiliary heating lamps, determining whether the fuser has been READY, and if not READY setting the fuser to READY;

determining whether the surface temperature is less than a predetermined fuser failure temperature less than the control value;

interrupting the printing operation if the surface temperature is less than the fuser failure temperature and a printing operation is present;

determining whether other failure conditions are present if the surface temperature is not less than the fuser failure temperature or a printing operation is not present;

performing a failure recovery process if other failure conditions are present;

determining whether a reading operation is present, and if present switching ON the main heating lamp and switching the auxiliary heating lamp OFF;

determining whether a printing operation is present, and if not present switching ON the main heating lamp and switching the auxiliary heating lamp OFF; and switching ON the main heating lamp and the auxiliary heating lamp and ending the method.

* * * * *

UNITED STATES PATENT AND TRADEMARK OFFICE
CERTIFICATE OF CORRECTION

PATENT NO. : 5,040,075

DATED : August 13, 1991

INVENTOR(S) : Hiroshi Takayanagi

It is certified that error appears in the above-identified patent and that said Letters Patent is hereby corrected as shown below:

On the title page: Item [54]: after "APPARATUS" insert --WITH CONTROL OF POWER LEVEL SUPPLIED TO FUSER BASED ON OPERATING CYCLE--.

Signed and Sealed this

Twenty-seventh Day of April, 1993

Attest:

MICHAEL K. KIRK

Attesting Officer

Acting Commissioner of Patents and Trademarks